G. H. WHITTINGHAM.
REVERSING SWITCH.
APPLICATION FILED NOV. 2, 1908.

965,671.

Patented July 26, 1910.
2 SHEETS—SHEET 1.

Witnesses

Inventor
G. H. Whittingham
By
Robert Watson
Attorney

G. H. WHITTINGHAM.
REVERSING SWITCH.
APPLICATION FILED NOV. 2, 1908.

965,671.

Patented July 26, 1910.
2 SHEETS—SHEET 2.

Witnesses
C. H. Walker
Newton P. Willis

Inventor
G. H. Whittingham
By Robert Watson
Attorney

UNITED STATES PATENT OFFICE.

GEORGE H. WHITTINGHAM, OF BALTIMORE, MARYLAND, ASSIGNOR TO MONITOR MANUFACTURING COMPANY OF BALTIMORE CITY, A CORPORATION OF MARYLAND.

REVERSING-SWITCH.

965,671.  Specification of Letters Patent.  Patented July 26, 1910.

Application filed November 2, 1908. Serial No. 460,666.

*To all whom it may concern:*

Be it known that I, GEORGE H. WHITTINGHAM, a citizen of the United States, residing at Baltimore, in the State of Maryland, have invented certain new and useful Improvements in Reversing-Switches, of which the following is a specification.

This invention relates to a simple form of reversing switch for electric motors, which may be operated by opening and closing push button switches and it comprises means whereby the motor may be operated at full speed in one direction and at a reduced speed in the opposite direction.

The invention is particularly applicable to motors used for operating certain types of printing machinery and other machines which have to be started and stopped frequently and where it is desirable to run the machine forward at one speed and backward at a reduced speed.

The invention comprises two movable switch members normally connected to one side of the supply circuit, and also connected to the armature terminals, and electrically controlled means for moving either one of these switch members so as to disengage it from one side of the supply circuit and connect it to the opposite side, to control the direction of movement of the motor.

It also comprises a brake-resistance which is connected to one side of the supply circuit and which is also used as a regulating resistance for controlling the speed of the motor.

Figure 1:
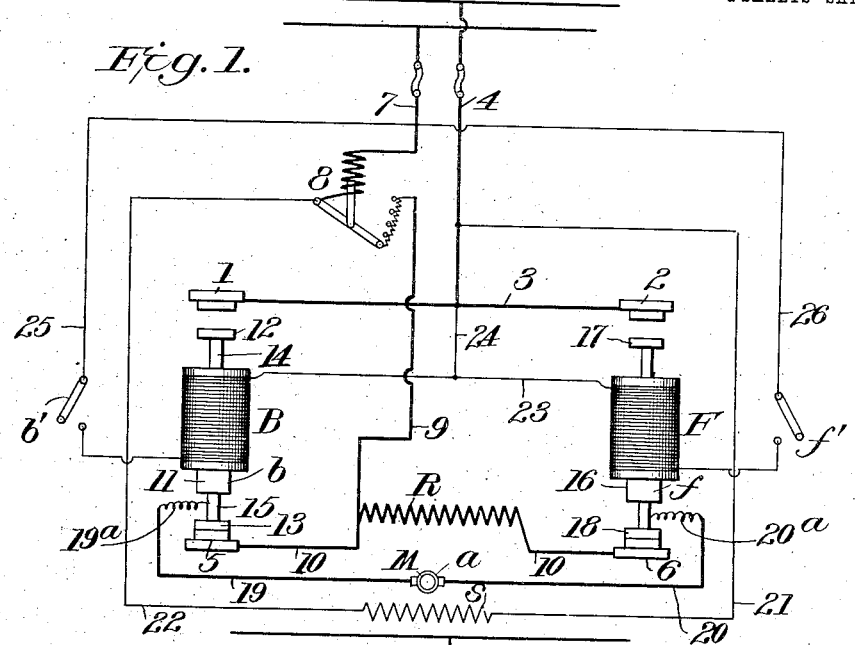
Figure 2:
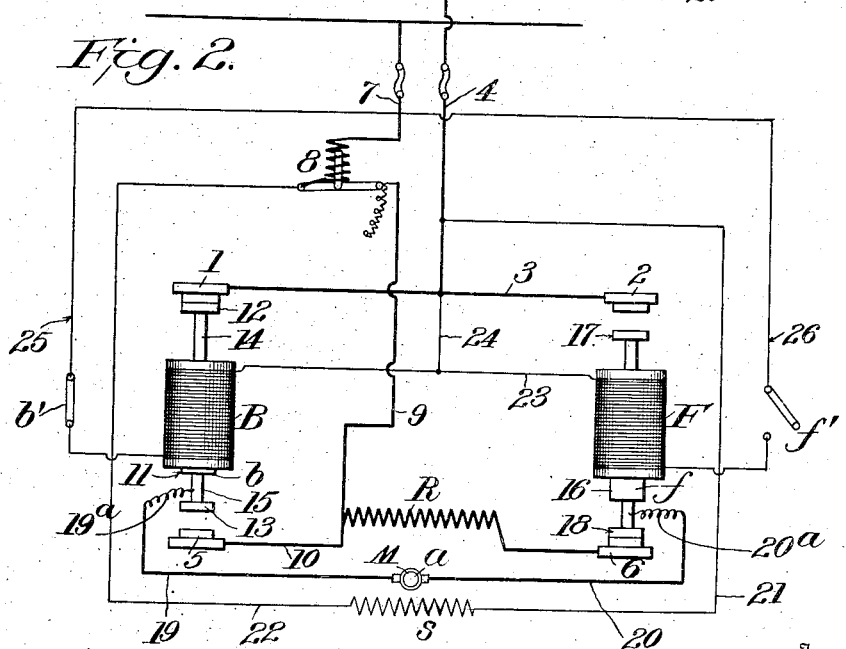
Figure 3:
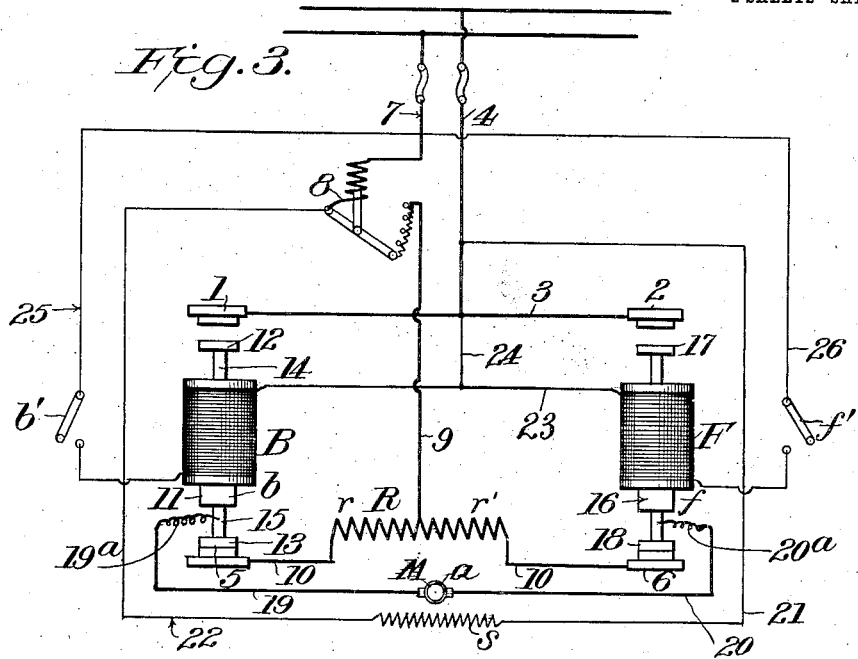
Figure 4:
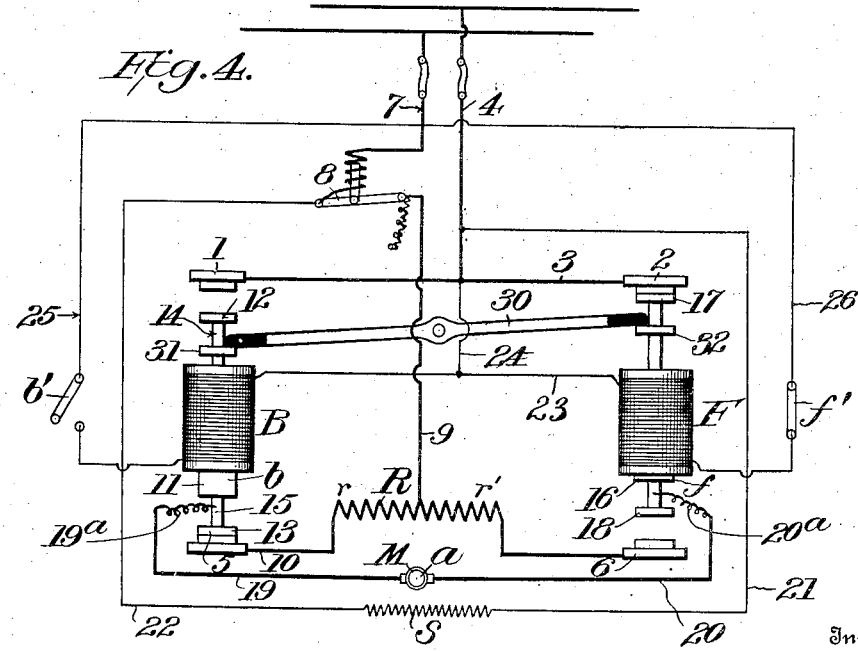

In the accompanying drawing, Figure 1 is a diagrammatic view illustrating the mechanism for operating an electric motor at full speed in one direction and at a reduced speed in the opposite direction, the parts being shown in normal positions; Fig. 2 is a similar view illustrating the operation of the device shown in Fig. 1; Fig. 3 is a similar view of a mechanism for operating the motor at the same speed in both directions; and, Fig. 4 is a similar view of the device shown in Fig. 3, illustrating its operation, and also showing an attachment for preventing the operation of more than one switch magnet at a time.

Referring to Figs. 1 and 2 of the drawing, 1 and 2 indicate a pair of contact members electrically connected together by the conductor 3, which latter is connected to the side 4 of the supply circuit. These contact members 1 and 2 are arranged above solenoids B and F, respectively, and immediately below the solenoids are arranged contact members 5 and 6 which latter are connected together by a conductor 10 and a brake-resistance R and they are also connected to the side 7 of the supply circuit through a suitable starting device 8 and a conductor 9, the latter, as shown in Figs. 1 and 2, being connected to one end of the brake-resistance R. The core 11 of the solenoid B has at its upper and lower ends contact members 12 and 13 which are secured to the core by copper conducting rods 14 and 15, respectively, and the core 16 of the solenoid F carries at its upper and lower ends contact members 17 and 18 similarly secured to said core. The core 11 with its attached contact members or surfaces constitutes a movable switch member *b* and the core 16 with its attached contact surfaces constitutes a switch member *f*. The switch member *b* normally rests upon the contact member 5 and the switch member *f* normally rests upon the contact member 6, so that these switch members are both normally connected to one side 7 of the supply circuit through the conductors 9 and 10. The terminals or brushes of the armature *a* of the motor M are connected by conductors 19 and 20 to the switch members *b* and *f*, respectively, the end portions 19$^a$ and 20$^a$ of said conductors being flexible and secured to the switch members as shown. Both armature terminals or brushes are therefore normally connected to one side of the supply circuit. The motor shown in the drawing is a shunt wound motor and its field coils are shown permanently connected by the conductors 21 and 22 to the sides 4 and 7 of the supply circuit. The coils of the solenoids B and F may be connected in any suitable way to a source of current supply. As shown in the drawing one terminal of each coil is connected by a conductor 23 to a conductor 24 which leads to the side 4 of the supply circuit, and the other terminals of the coils are connected by conductors 25 and 26 to the side 7 of the supply circuit, suitable push buttons or other hand switches *b'* and *f'* being provided for opening and closing the circuits through the solenoid coils.

The operation of the device shown in Figs. 1 and 2 is as follows: Normally the members are in the positions shown in Fig. 1, both armature terminals being connected to one side of the supply circuit by reason of the engagement of the switch members $b$ and $f$ with the contacts 5 and 6. When the push-button or hand switch $b'$ is closed, the switch member $b$ is lifted by the coils of the solenoid B until the contact surface 12 engages the contact surface 1, as shown in Fig. 2. This, it will be seen, disconnects the armature conductor 19 from the side 7 of the supply circuit and connects it with the side 4, while the armature conductor 20 still remains connected to the side 7 of the supply circuit, through the brake-resistance R. Current will then flow from the side 7 through the brake-resistance and contacts 6 and 18 and conductor 20 to the armature and thence through conductor 19, switch member $b$, contact 1 and conductor 3 to the side 4 of the supply circuit. This will cause the rotation of the motor in one direction at a speed less than its normal speed because the brake-resistance R is in series with the armature. When the switch $b'$ is opened the switch member $b$ drops by gravity out of engagement with the contact surface 1 at the side 4 of the supply circuit and into engagement with the contact surface 5 at the opposite side of the supply circuit. As the brake-resistance R is included between the contact members 5 and 6, it will be seen that when the switch member $b$ drops the current generated by the momentum of the armature will flow through the brake-resistance and cause a prompt stoppage of the motor. The field coils $s$ are preferably left connected to both sides of the supply circuit so as to insure a strong field for braking purposes. When the switch $f'$, Figs. 1 and 2, is closed, the switch member $f$ moves out of engagement with the contact 6 and into engagement with the contact 2 thereby disconnecting the armature conductor 20 from the side 7 of the supply circuit and connecting it with the side 4, while the armature conductor 19 remains connected to the side 7 of the supply circuit. As the connection between the contacts 6 and 18 is then broken, no current can flow through the brake-resistance R and hence the armature will receive current from the side 7 of the supply circuit, through conductors 9 and 10, contact 5, switch member $b$ and conductor 19, and the current will flow from the armature through conductors 20, switch member $f$, contact 2, and conductor 3 to the side 4 of the supply circuit, thus operating the motor at a higher speed than before and in a reverse direction. When the switch $f'$ is opened the solenoid F is deënergized and the switch member $f$ drops, breaking connection with the side 4 of the supply circuit and establishing connection with the opposite side of the supply circuit and also completing the connection between the brake-resistance and the armature conductor 20 so that the braking action may then take place while the motor is moving under its own momentum.

It will be noted that in this reversing switch the armature is normally connected to one side of the supply circuit through both movable switch members and that by simply moving one of said members over to the other side of the supply circuit the circuit is completed through the armature, one or the other terminal of which always remains connected to one side of the supply circuit through one or the other of the movable switch members in the normal operation of the apparatus. If, by chance, some one should close one of the push button switches while the other push button switch is closed and the motor is in operation, this would merely result in connecting both of the electrically controlled switch members to the side 4 of the supply circuit and disconnecting them from the side 7 which would result in stopping the motor and could cause no injury to the motor. Ordinarily this would not occur where the push button switches are under the control of one person; but where such an event is liable to happen suitable mechanical interlocking devices may be employed to prevent one solenoid from operating while the other is energized as hereinafter described.

In the device just described, the brake-resistance is omitted from the armature circuit while the motor armature is running in one direction, and is included in said circuit while the motor is running in the opposite direction, thus giving a full speed in one direction and a reduced speed in the opposite direction.

By connecting the wire 9, in Figs. 1 and 2, to the wire 10, at the right of the resistance R, instead of at the left, it will be evident that the operation, with respect to the speeds, will be reversed, the brake-resistance being then included in the armature circuit when the push button $f'$ is closed and being eliminated from the armature circuit when the push button $b'$ is closed. If the wire 9 is connected to the center of the brake-resistance, as shown in Figs. 3 and 4, the speed of the motor will be the same in both directions of rotation, being slightly less than the normal full speed because of the fact that one-half of the brake resistance will be in the armature circuit while the motor is being driven. As a brake resistance, to be effective, in a brake circuit, must be a comparatively low resistance, the interposition of one half of this resistance in the armature circuit, while the motor is being driven would not very materially reduce the speed of the motor armature. While, with the connections shown in Figs. 3 and 4, only one-half of the brake-resistance is in circuit while the motor is being driven, yet the full brake-resistance is in circuit with the armature when the motor armature is operating under its own momentum.

In Fig. 4 the push button $f'$ is shown in closed position and the solenoid F has lifted its core, the connection between the core and the side 7 of the supply circuit being thereby broken and the connection between said core and the side 4 of the supply circuit being thereby established, and as the core is connected to the armature of the motor, the current to the armature flows from the side 7 of the supply circuit through the starter and conductor 9, thence through the section $r$ of the resistance R, through conductor 10 to the contact 5, thence through contact 13, conductors $19^a$ and 19 to the armature $a$, thence through conductors 20 and $20^a$, core 16, contacts 17 and 2, and conductor 3 to the side 4 of the supply circuit. The motor will therefore run in one direction with the section $r$ of the brake resistance in circuit with the armature. When the switch $f'$ opens the core 16 drops, thereby disconnecting the armature from the side 4 of the supply circuit and connecting the entire brake-resistance in series with the armature. If the push button $b'$ is now closed the solenoid B will lift its core thereby disconnecting the latter from the side 7 of the supply circuit and connecting it to the side 4 of the supply circuit, so that the current will then flow from the side 7 through conductor 9, resistance section $r'$, contacts 6 and 18, conductors $20^a$ and 20, armature $a$ conductors 19 and $19^a$, contacts 12 and 1 and conductor 3 to the side 4 of the supply circuit. When the push button $b'$ is opened the core 12 drops, breaking its connection with the side 4 of the supply circuit and establishing its connection with the side 7 and also connecting the brake resistance in series with the armature.

In order to prevent one solenoid from being operated while the core of the other solenoid is raised, a suitable mechanical connection may be made between the cores, such for instance as the centrally pivoted bar 30 made wholly or partly of insulating material (Fig. 4) having its ends projecting over the collars 31 and 32 on the rods 14 of the cores 11 and 16. If the push button $f'$ is closed, as shown in Fig. 4, the collar 32 is raised by the core of the solenoid F and this collar, 32, lifting one end of the lever 30, depresses the opposite end, which extends over the collar 31 movable with the core 11. As the core 16 is then in a more effective position within the coils of the solenoid F than is the core 11 within the coils of the solenoid B, the core 11 cannot lift, if the switch $b'$ is closed after the push button $f'$ is closed and the core 16 is lifted.

Similarly if the push button $b'$ is closed while the push button $f'$ is open and the latter switch is then closed, the core 11 will hold the lever in position to prevent the core 16 from lifting. Any suitable mechanical device may be used for the purpose of preventing more than one of the solenoids from being operated at one time.

It is evident that the conductor 3 may be a metal bar having suitable contact surfaces 1 and 2 above the solenoid. When the reversing switch is used with small motors having a comparatively high armature resistance, the brake-resistance R may be omitted, in which case the contact members 5 and 6 would be connected directly together by the conductor 10, which may be a metal bar.

What I claim is:—

1. In a reversing switch for electric motors, the combination with a motor having shunt field windings, of two contact members connected to one side of the supply circuit, a resistance connected between said contact members, two switch members connected to the armature terminals and normally engaging said contact members, and means for disengaging either of said switch members from said contact members and for connecting it to the opposite side of the supply circuit.

2. In a reversing switch for electric motors, the combination with a motor having shunt field windings, of two contact members connected to one side of the supply circuit, a resistance connected between said contact members, two switch members connected to the armature terminals and normally engaging said contact members, and electromagnetic means for disengaging either of said switch members from said contact members and for connecting it to the opposite side of the supply circuit.

3. In a reversing switch for electric motors, two contact-members connected to one side of the supply circuit, a brake-resistance connected between said contact-members, two switch-members connected to the armature terminals and normally engaging said contact members, and means for disengaging either of said switch members from said contact members and for connecting it to the opposite side of the supply circuit.

4. In a reversing switch for electric motors, two contact-members connected to one side of the supply circuit, a brake-resistance connected between said contact-members, two switch members connected to the armature terminals and normally engaging said contact-members, and electromagnetic means for disengaging either of said switch members from said contact members and for connecting it to the opposite side of the supply circuit.

5. In a reversing switch for electric motors, two contact-members connected to one side of the supply circuit, a brake-resistance connected between said contact-members, two switch members connected to the armature terminals and normally engaging said contact members, and separately controlled devices for disengaging said members from said side of the supply circuit and for connecting them to the opposite side of the supply circuit.

6. In a reversing switch for electric motors, two contact-members connected to one side of the supply circuit, a brake-resistance connected between said contact-members, two switch members connected to the armature terminals and normally engaging said contact members, and separately controlled electromagnetic devices for disengaging said members from said side of the supply circuit and for connecting them to the opposite side of the supply circuit.

7. In a reversing switch for electric motors, two contact members or surfaces connected to one side of the supply circuit, a brake-resistance connected between said surfaces, two independently movable switch members normally engaging said surfaces and connected to the armature terminals, and contact surfaces connected to the opposite side of the supply circuit and adapted to be engaged by said switch members when the latter are moved from normal positions.

8. In a reversing switch for electric motors, a pair of contact surfaces connected to one side of the supply circuit, an opposing pair of contact surfaces connected to the opposite side of the supply circuit, independently movable switch members arranged between said pairs of surfaces and normally engaging one pair of surfaces, a brake-resistance connected between said latter pair of surfaces, and electrical connections between said switch members and the armature terminals.

9. In a reversing switch for electric motors, a pair of contact surfaces connected to one side of the supply circuit, an opposing pair of contact surfaces connected to the opposite side of the supply circuit, independently movable switch members arranged between said pairs of surfaces and normally engaging one pair of surfaces, a brake-resistance connected between said latter pair of surfaces, electrical connections between said switch members and the armature terminals, and electromagnetic means for moving said switch members.

10. In a reversing switch for electric motors, two contact members, a brake-resistance connected between said members, a supply circuit having one side connected at one end of said brake resistance, two switch members connected to the armature terminals and normally engaging said contact members, and means for disengaging either of said switch members from said contact members and for connecting it to the opposite side of the supply circuit.

11. In a reversing switch for electric motors, a pair of contact members or surfaces connected to one side of the supply circuit, a brake-resistance connected between said surfaces, a pair of independently movable switch members normally resting upon said surfaces and electrically connected to the armature terminals, contact members or surfaces arranged above said switch members and connected to the opposite side of the supply circuit, and electrically controlled means for lifting said switch members into engagement with said latter surfaces.

12. In a reversing switch for electric motors, a pair of contact members or surfaces connected to one side of the supply circuit, a brake-resistance connected between said members, a pair of switch members normally resting upon said members or surfaces and electrically connected to the armature terminals, independently controlled solenoids for lifting said members away from said surfaces, and contact surfaces connected to the opposite side of the line and arranged above and normally out of contact with said switch members.

In testimony whereof I affix my signature, in presence of two witnesses.

GEORGE H. WHITTINGHAM.

Witnesses:
 FELIX R. SULLIVAN,
 A. V. JAVINS.